June 23, 1964  F. N. PIASECKI  3,138,349
ROTARY WING AIRCRAFT TAIL ASSEMBLY AND CONTROLS
Filed Jan. 15, 1962  4 Sheets-Sheet 1

INVENTOR
Frank N. Piasecki

BY Mason, Fenwick & Lawrence
ATTORNEYS

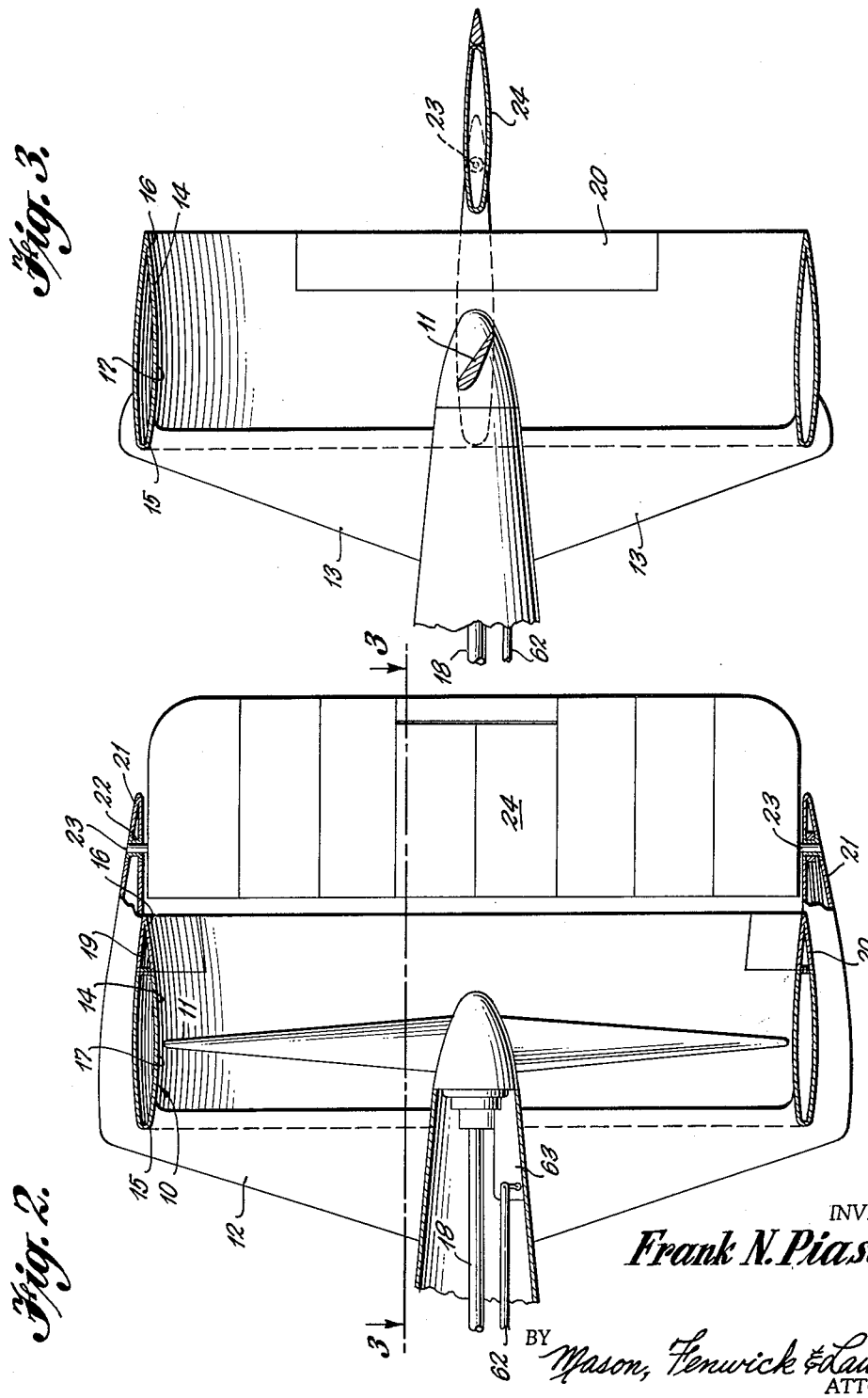

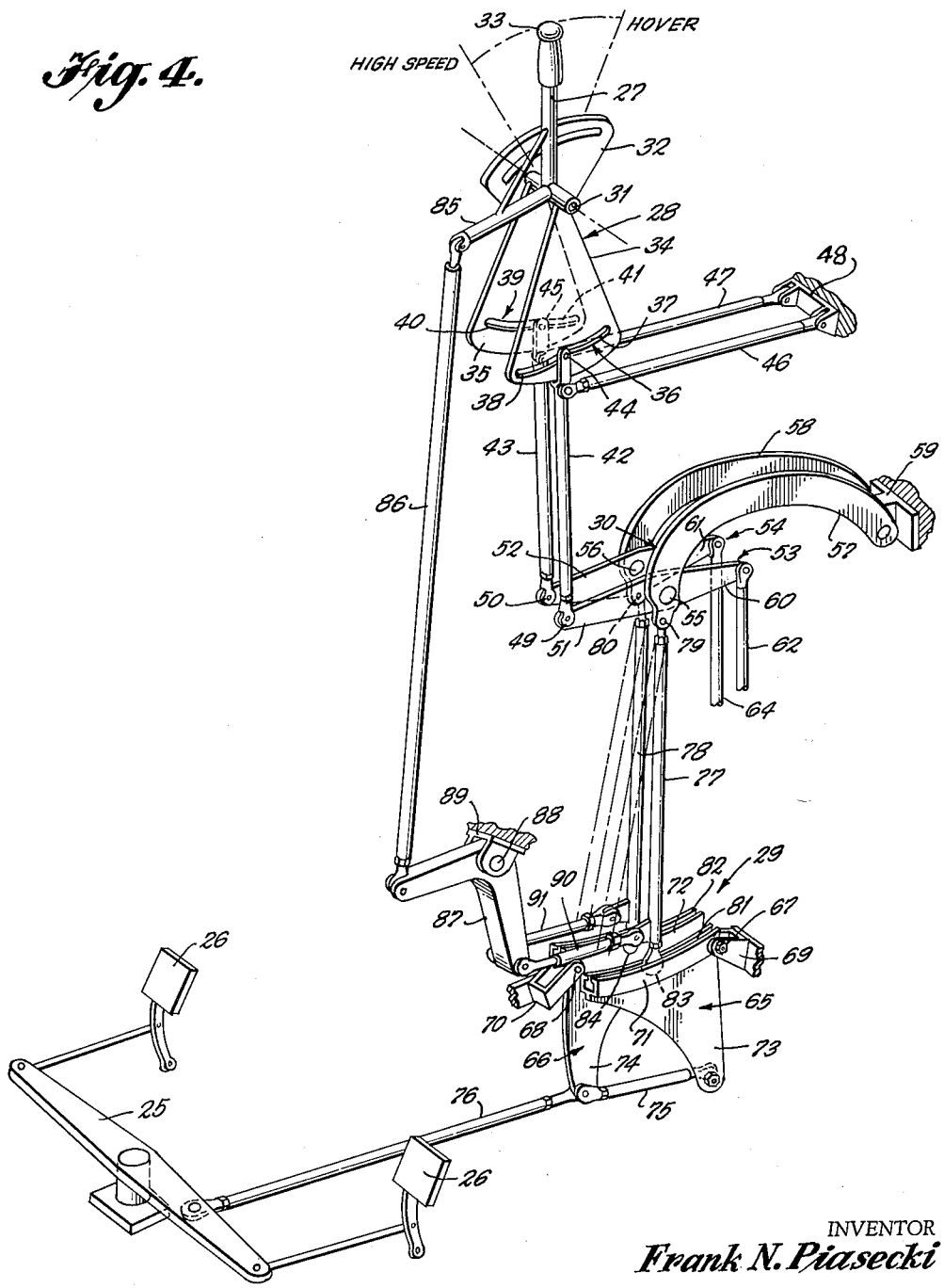

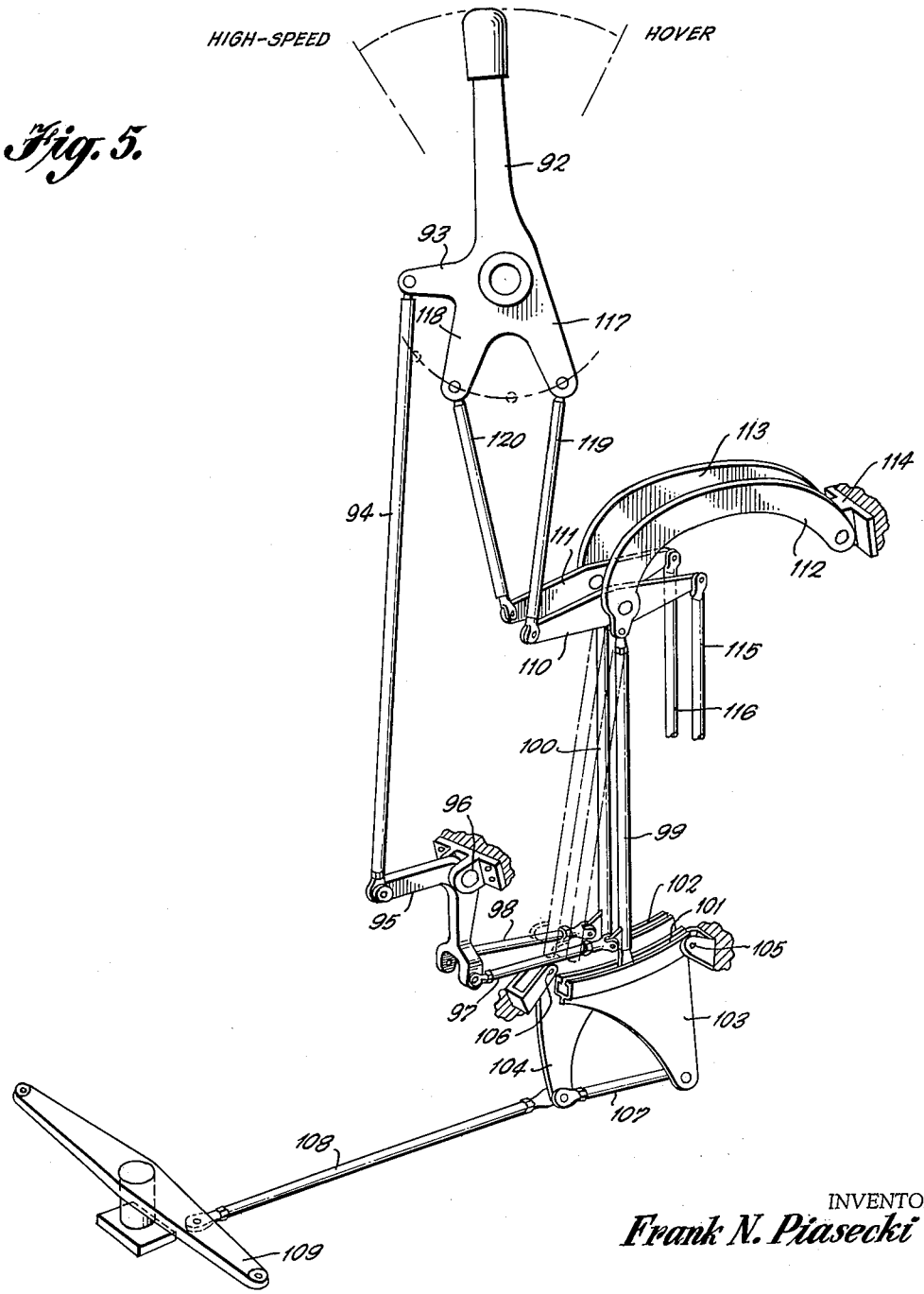

United States Patent Office 3,138,349
Patented June 23, 1964

3,138,349
ROTARY WING AIRCRAFT TAIL ASSEMBLY AND CONTROLS
Frank N. Piasecki, Haverford, Pa., assignor to Piasecki Aircraft Corporation, Philadelphia, Pa., a corporation of Pennsylvania
Filed Jan. 15, 1962, Ser. No. 166,292
12 Claims. (Cl. 244—17.21)

This invention relates generally to rotary wing aircraft, and more particularly to helicopters of the shaft driven, single rotor type having improved means for torque correction.

It has been almost universal to correct for torque developed by the overhead rotor of a single rotor helicopter by use of the so-called tail rotor. This consists of a small propeller mounted upon a shaft lying transversely of the aircraft and located at the end of a boom projecting rearwardly from the fuselage. The propeller develops a lateral thrust and the boom serves as a lever arm, so that relatively small thrust by the tail rotor is usually sufficient to counteract the torque developed by the overhead revolving main rotor.

There are a number of recognized disadvantages to tail rotor systems, however, and among these are: (1) Loss of the engine power necessary to drive the tail rotor; (2) An ever present hazard to ground personnel due to exposed position of tail rotor; (3) Complete loss of machine due to minor loss of tail rotor brought about by hitting brush or other object on landing, thus causing the machine to spin and capsize; (4) High frequency vibrations induced into the machine by the tail rotor and the boom; and (5) High maintenance costs on the tail assembly.

The general object of the present invention is to provide torque correction means which will eliminate most, if not all, of the above-noted objections to use of the conventional tail rotor.

A more specific object is to provide improved torque control means which will incorporate forward propulsion means so that torque control, forward propulsion, or a combination of the two effects can be produced.

Another object is the provision of torque control means wherein the thrust-developing member is housed to protect personnel from accidental contact with it, and the housing is utilized to increase the thrust which is developed by the member.

A further object of the invention is to provide a helicopter tail assembly having means to develop a thrust rearwardly of the machine and means to form a reaction surface for the thrust to determine its effective direction, and controls for that assembly to regulate the respective means in accordance with a selected regime.

It is also an object to provide a control mechanism for regulating two separate instrumentalities from a single operating member in accordance with changing conditions, with means for pre-setting the control mechanism to provide different relative movements of the instrumentalities in accordance with the requirements of selected conditions.

Other objects of the invention will become apparent from the following description of practical embodiments thereof, when taken in conjunction with the drawings which accompany, and form part of, this specification.

In the drawings:

FIGURE 2 is a central, vertical, longitudinal section, on an enlarged scale, taken through the tail assembly of the helicopter shown in FIGURE 1;

FIGURE 3 is a horizontal section taken on the line 3—3 of FIGURE 2;

FIGURE 4 is a perspective view of the control mechanism for the rudder and propeller of the tail assembly; and FIGURE 5 is a perspective view of a slightly modified form of control mechanism.

Figure 1:
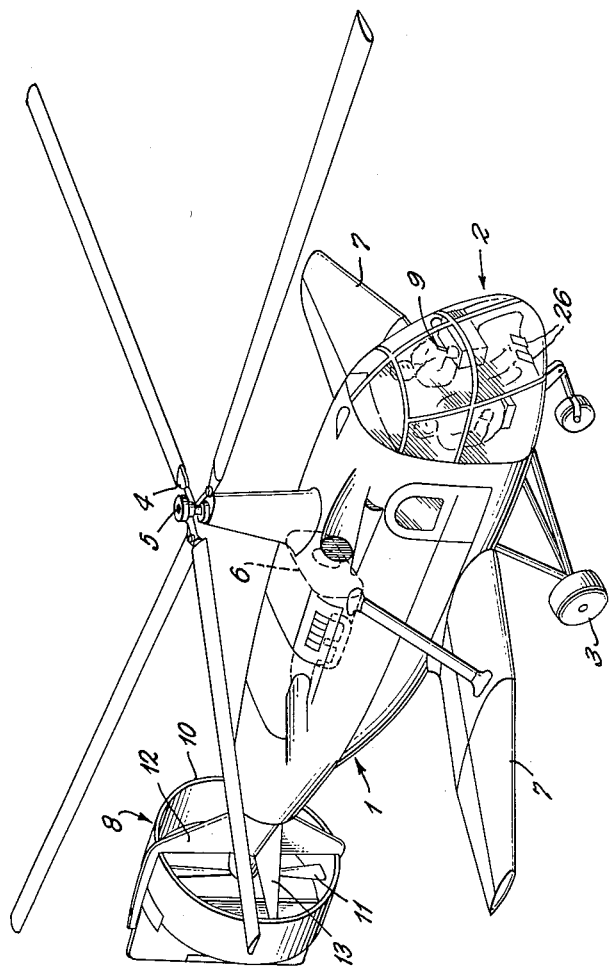
FIGURE 1 is a perspective view of a helicopter having the improved tail assembly and controls therefor contemplated by the present invention.

In general, the present invention is concerned with providing single rotor helicopters with what may be termed a ring tail, for rotor torque correction and for forward propulsion. The ring tail includes a propeller and a shroud therefor, having coincident axes arranged longitudinally of the aircraft, with vanes movable in the propeller slipstream to provide reaction surfaces to control the effective direction of the propeller thrust. The invention also contemplates control means for the propeller, and vanes to regulate their relative actions within preset limits selectively determined for desired flight conditions.

Referring to the drawings in detail, there is shown, somewhat conventionally, a helicopter 1 having a fuselage 2, suitable landing gear 3, and a single rotor assembly 4 mounted upon a vertical shaft 5 above the fuselage. The rotor will be driven from the usual engine 6, shown in dotted lines, and will have standard controls (not shown). The machine shown includes short wings 7. A ring tail assembly 8 is carried at the rear of the fuselage, and controlled by a manual control system 9.

The helicopter illustrated is merely an example of one type of machine with which the invention may be used. It is to be understood that any single rotor type helicopter can be provided with the tail assembly and controls of the present invention.

The tail assembly 8 includes a circular shroud 10 in which a propeller 11 is mounted. The shroud is attached to the fuselage end through vertical and horizontal stabilizers 12 and 13, which are connected to the shroud at the ends of the vertical and horizontal diameters of the shroud, and to the fuselage at their region of intersection at the central axis of the shroud. The stabilizers may take any convenient shape, and will be rigid and immovable.

The shroud may have an airfoil cross-section, thus providing a fore and aft curvature both outside and inside the shroud. The inner surface 14, which defines the duct through which the air column for propeller 11 is drawn, will have its inlet end 15 and its outlet end 16 of larger cross-sectional area than the mid-section 17. Usually, the propeller will be mounted in the plane of smallest cross-section, and the propeller length will be such that in rotation the propeller will approximately cover the entire area of the inner opening of the shroud in the plane of rotation of the propeller. This arrangement will affect the propeller action in two ways, both of which will result in increased thrust for a propeller of given diameter, pitch and speed. The first effect is to prevent the slipstream from the propeller from contracting downstream to one-half the propeller diameter as it would do in the case of a free propeller. The second is the confining of the column against lateral escape so that there will be no tip losses and the thrust of the full blade length will be effective. By reason of this, smaller propellers and less engine power will be required to provide the desired force.

The propeller 11 is of the adjustable pitch type and may be mounted upon a shaft 18, driven by the engine 6, or, if desired, a separate engine may be provided for the propeller.

Trim tabs 19 and 20 may be provided at the top and bottom trailing edge of the shroud to control pitch of the aircraft. These can be controlled by normal and conventional pitch controls (not shown), but these controls form no part of the present invention.

Vane brackets 21 project from the rear of the shroud at top and bottom, to carry bearings 22 for pivot trunnions 23 of a rudder 24. The rudder is the full height of the shroud, and is pivoted intermediate its front and back ends to provide maximum rudder area at the center portion of the propeller slipstream when the rudder is deflected from a true fore and aft position.

The ring tail as just described may be used to counteract the torque of the rotary wing to hold the fuselage against spinning, and to control the movement of the machine in yaw, and also as a means for forward propulsion of the helicopter. When hovering, the rudder may be turned sharply, approximately 70°, in the direction of rotor torque, so that the slipstream from propeller 11 will impinge upon it and create a lateral counter-thrust to offset the rotor torque. With the rudder in set position, the lateral thrust can be increased or decreased to control the fuselage position by changing the propeller pitch, or speed, or both. When it is desired to propel the machine at high forward speed, the rudder will be moved to a more nearly fore and aft position and the propeller thrust will be forwardly to move the machine forwardly. During this movement, the helicopter rotor 4 may be in autorotation, and the rotor and wings 7 will each provide a portion of the lift required to keep the machine in level flight. Under these conditions, pitch of the machine is controlled by the tabs 19 and 20, and the aircraft is controlled in yaw by movement of the rudder 24.

From the above it will be clear that when the helicopter is hovering, the rudder, or vane, setting will be varied little, while changes in propeller pitch will be the controlling factor. When in high speed, forward flight, however, the propeller pitch remains substantially constant, while the rudder is moved to control machine direction. It is desirable, therefore, that a single control mechanism be provided which can be set for either hovering or forward flight and, when so set, will provide control of the propeller pitch and rudder position in accordance with requirements in the condition selected. One such control mechanism is shown in FIGURE 4.

It is convenient and desirable, in view of the fact that yaw control is the ultimate end sought by varying the propeller pitch and rudder position, that the control mechanism be operable from the usual rudder bar 25. The rudder bar may be controlled by conventional foot pedals, or stirrups 26.

The control mechanism includes a function lever 27 with a cam set 28, a discriminator 29, and what may be called a mixing unit 30.

The function lever is a manually controlled lever, pivotally mounted at 31 for rocking movement. From a mid-position where the lever is vertical, the lever can be moved to the right (as shown in FIGURE 4) through the hover phase of control, or to the left, through the high speed phase of control. The lever may operate adjacent a quadrant 32 and have a release button 33 in its top, so that the lever may be moved to any desired position and locked in place.

The cam set 28 is carried by the lever and includes two cams, a propeller pitch cam 34 and a rudder cam 35, with the two cams being fixed to the lever and movable with it. The propeller pitch cam 34 has a cam slot 36 which is divided into two segments, a dwell 37 having an arc struck from the lever pivot 31, and an actuating segment 38 whose distance from the pivot 31 increases as its distance from the dwell segment increases. The cams depend from the lever and, in the embodiment shown, the vertical bisectors of the cams lie in a plane which includes the longitudinal axis of the lever. The dwell 37 and actuating segment 38 of slot 36 join at the vertical bisector of the cam 34. The dwell segment occupies the right half of the cam and will cross the vertical plane, above referred to, when the lever is moved from its center position to the full hover position. The actuating segment will move through the vertical plane when the lever is moved from its center position to full high speed position. The rudder cam 35 is a duplicate of the cam 34, having slot 39, a dwell segment 40 and an actuating segment 41, but the respective segments are reversed, so that when the dwell segment of one cam is crossing the vertical plane the actuating segment of the other cam will be moving across the same plane. It will be clear that with this arrangement, mechanisms controlled by the cams can be operated in alternation, as one will be in the dwell of one cam and inoperative while the other will be in the actuating segment of its cam and operative during movement of the lever from its central position in one direction. When the lever is moved from its central position in the opposite direction, the opposite result will be obtained.

Cam following rods 42 and 43 are connected at one end by pins 44 and 45 to the cams 34 and 35, the pins passing through the slots in the cams so that the rods will be raised and lowered as the cams are rocked. The upper ends of the rods are connected to tie links 46 and 47 which have their opposite ends pivotally connected to a bracket 48 fixed to a convenient part of the machine frame. The tie links hold the rod upper ends against lateral swinging movement, so that movement of the cams will result in vertical movement of the rods.

The lower ends of rods 42 and 43 are pivotally connected, at 49 and 50, to arms 51 and 52 of levers 53 and 54 which form part of the mixing unit 30. The levers are pivotally mounted by connections 55 and 56 to the ends of mixing arms 57 and 58. The arms are pivotally connected at their opposite ends to a fixed bracket 59. The levers have arms 60 and 61 to which are pivotally connected a control rod 62 having its opposite end connected to the propeller pitch changing mechanism 63, and a control rod 64 having its opposite end connected to the rudder.

It will be evident that the linkage described will operate to control movement of the propeller pitch changing mechanism and the rudder whenever the function lever 27 is moved. When the lever is moved in one direction pin 44 on rod 42 will ride in the dwell of slot 36 in cam 34 and there will be no movement of rod 42, while pin 45 on rod 43 will ride in the actuating segment of slot 39 of cam 35 and will be moved vertically, causing lever 54 to rock about its pivot 56 and actuate control rod 64 to move the rudder. When the function lever is moved to the opposite side of its control position, an opposite movement takes place and the lever 53 is rocked to adjust propeller pitch while no movement is given to the rudder.

In order to impart additional control movement to the propeller pitch changing mechanism, or the rudder, or both, after an initial setting by movement of the function lever, the two levers 53 and 54 are connected to the rudder bar 25 by means which is adjusted by the initial movement of the function lever to result in movement of the rudder and propeller pitch control in desired ratio. The connection of the levers to the rudder bar is through the discriminator 29, and that unit is connected to, and adjusted by, the function lever.

The discriminator consists of a pair of bell cranks 65 and 66, which are pivoted at their mid-points, by pivot pins 67 and 68, to fixed brackets 69 and 70. Each bell crank has an upper, horizontal leg, 71, 72, and a vertical leg, 73, 74. The bell cranks are mounted so as to move in opposite phase, with the pivot 67 of the bell crank 65 being adjacent the free end of the upper leg 72 of the bell crank 66. In other words, the two bell cranks lie side by side with their upper legs in overlapping relation and their pivots at opposite ends of the respective upper legs when the rudder bar is in a neutral position. The vertical legs depend from the bell crank pivots and, therefore, have their lower ends spaced apart substantially the distance between the bell crank pivots. The vertical legs 73 and 74 are joined by a link 75 so that the bell cranks must swing about their pivots in unison and in equal amounts. Movement of the bell cranks in a clockwise direction, as viewed in FIGURE 4, will result in upward swinging movement of the horizontal leg 71 of bell crank 65, and a downward swinging movement of horizontal leg 72 of bell crank 66. A tie bar 76 connects the vertical leg of one of the bell cranks to the rudder bar 25, so that movement of the rudder bar will cause the bell cranks to rock.

Although the bell cranks 65 and 66 will rock in unison and in equal amounts, it is important that the effective output of the bell cranks vary with the setting of the function lever. To this end, the horizontal arms 71 and 72 are connected to the levers 53 and 54 by means of ratio rods 77 and 78 which are pivotally connected to ears 79 and 80 on the levers 53 and 54, and have pivotal and sliding connection to the horizontal legs 71 and 72 of the bell cranks 65 and 66. In order to provide this latter connection, the horizontal upper arms of the bell cranks 65 and 66 carry open, channel-like slides 81 and 82 along their upper edges. The ratio rods have spherical ends 83 and 84 for sliding engagement with the channels. The slides are curved on a radius approximately equal to the length of rods 77 and 78 so that the spherical ends of the rods can be moved freely from one end of the slides to the other when the bell cranks are in the neutral position shown, without causing movement of either bell cranks 65 and 66, or levers 53 and 54. It will be obvious that the distances of the spherical ends of the ratio rods from the pivots of the respective bell cranks 65 and 66 will determine the effective lengths of the upper legs of the bell cranks and, consequently, the amount of movement which will be given to the rods when the bell cranks are rocked.

The positions of the ratio rods in the slides are set by movement of the function lever. This lever is provided with an arm 85, projecting at right angles to the lever, and the arm is connected to a link 86, pivotally joined to one leg of a bell crank 87 pivotally mounted at 88 to a fixed bracket 89. The other leg of the bell crank is connected to a pair of toggle links 90 and 91 which are connected, respectively, to the ratio rods 77 and 78.

When the function lever occupies its neutral, or central, position, as shown in full lines, the linkage 85, 86, 87, 90 and 91 will position the ratio rods at the centers of the slides on the bell crank legs 71 and 72 and, therefore, equidistant from the bell crank pivots 67 and 68. At this setting, movement of the rudder bar will rock the bell cranks 65 and 66 and cause equal movement of the ratio rods, but in opposite directions. If the function lever is moved to full hover position, the spherical end 84 of the ratio rod 78 will be in alignment with the axis of the pivot 68 of the bell crank 66, so that rocking of that bell crank will not impart any motion to the ratio rod 78. The spherical end 83 of the ratio rod 77, however, will be at the outer free end of its slide and the rod will be given full movement when the rudder bar is moved. With the function lever in full high speed position the opposite movement will result. It will be obvious that with the function lever in any other position some movement will be given to each ratio rod, and they will move in proper ratio as indicated by the function lever position.

From the above it will be clear that when the function lever is moved to full hover position, cam 35 will cause rod 43 to move downwardly, rocking lever 54 to turn the rudder sharply to its proper hover position. No change will be made in propeller pitch as the pin 44 of rod 42 will be riding in the dwell portion of slot 36 in cam 34. As the function lever is moved to hover position, arm 85, link 86, bell crank 87 and toggle links 90 and 91 will draw ratio rods 77 and 78 to one end of the slides on bell cranks 65 and 66, as shown in dotted lines in FIGURE 4. As the spherical end 84 of rod 78 is now in axial alignment with the pivot 68 of bell crank 66, there will be no movement of ratio rod 78 when the rudder bar is moved and, therefore, the rudder bar movement will have no effect upon the rudder control and the rudder will not change position. As described, however, the spherical end 83 of ratio rod 77 will be at the outer free end of its slide and any movement of the rudder bar will result in vertical movement of the ratio rod. This, in turn, will cause vertical movement of the pivot 55 mounting the lever 53 on the mixing arm 57, so that the lever will be moved vertically, swinging about its pivotal connection 49 with the rod 42. This will cause movement of the propeller pitch control rod 62 to adjust the propeller pitch. Thus, movement of the rudder bar will increase or decrease the thrust delivered by the propeller 11 against the set rudder, and thereby control the aircraft in yaw.

When the function lever is moved to the full high speed position, the linkages are moved in an opposite direction so that propeller pitch is set at optimum for high speed flight but the rudder remains at approximately a neutral position. With this setting, movement of the rudder bar controls rudder movement without changing propeller pitch in substantially the manner used in controlling conventional stationary winged aircraft. It will be apparent that when the function lever is set at positions intermediate those described, there will be a mixing of the control of the rudder and propeller pitch to the correct ratio for the particular aircraft movement selected.

In FIGURE 5, a slightly modified control mechanism is shown, which, nevertheless, will provide the same dual control as the mechanism just described. In this form the function lever 92 has a discriminator control arm 93, which is connected by a link 94 as before to a bell crank 95. The bell crank is pivoted at 96 and connected by toggle links 97 and 98 to the ratio rods 99 and 100. The ratio rods ride in slides 101 and 102 of bell cranks 103 and 104, mounted at opposite positions on pivots 105 and 106. The bell cranks 103 and 104 are tied together by tie link 107 and one of them is connected by drag link 108 to rudder bar 109. The ratio rods are connected to levers 110 and 111, pivotally mounted on mixing arms 112 and 113, pivotally connected on fixed bracket 114. The levers are joined to the ends of a propeller pitch control rod 115 and a rudder control rod 116. To the extent described, the second form of control mechanism is identical to that previously described.

In this form, however, the cams of the previous form are not used. Instead, the function arm has a pair of depending arms 117 and 118, positioned equiangularly on opposite sides of the projected longitudinal axis of the function lever. These two arms are connected to the levers 110 and 111 by means of rods 119 and 120.

It will be clear from an examination of FIGURE 5 that if the function lever has a vertical neutral position, and is moved to hover position, the arms 117 and 118 will be moved in a clockwise direction. As these arms occupied before movement, positions equidistant from the vertical, arm 117 will travel in a substantially horizontal path and there will be relatively no vertical movement of the rod 119 and no movement of lever 110 or propeller pitch control rod 115. Arm 118, however, will be on an upward arc of its rotative movement so that it will draw up on rod 120 and so rock lever 111 and move rudder control rod 116. Linkage 93, 94, 95 and 98 will adjust the ratio rods so that subsequent movement of the rudder bar will result in propeller pitch change.

When the function lever is moved to high speed position, the opposite result will be obtained, for the movement of arms 117 and 118 will be in a counter-clockwise direction, and arm 118 will move along a horizontal arc while arm 117 will swing in the vertical component of its arcuate travel. Thus, the propeller pitch will be set initially, and movement of the rudder bar will cause rudder deflection.

Both disclosed forms of control mechanism will permit proportional operation of two instrumentalities from a single control member. In each there is means to pre-select, or pre-set, the ratio or proportion in which the two instrumentalities are to be controlled.

In the above, practical embodiments of the invention have been disclosed, but it will be understood that the details of construction shown and described are merely by way of illustration, and the invention may take other forms within the scope of the appended claims.

What is claimed is:

1. In rotary wing aircraft of the type having a fuselage and a shaft driven single rotor mounted over the fuselage, means to correct rotor torque comprising, a variable pitch propeller mounted at the tail of the fuselage for rotation about an axis extending longitudinally of the aircraft, means to drive the propeller, a shroud encircling the propeller defining a longitudinally extending air duct in which the propeller rotates and concentric to the propeller axis, a vertical rudder pivotally mounted at the rear of the shroud for horizontal deflection in the propeller slipstream, a control rod connected to the rudder, a control rod connected to the propeller to effect propeller pitch changes, a rudder bar, means interconnecting the rudder bar and the rudder and propeller control rods so that movement of the rudder bar will cause movement of the control rods, a function lever, and means interconnecting the function lever and the means interconnecting the rudder bar and control rods to vary the relative amounts of control movement given the respective control rods upon rudder bar movement in accordance with pre-selected positions of the function lever.

2. In rotary wing aircraft as claimed in claim 1, wherein movement of the function lever varies in inverse ratio the amount of control movement given the respective control rods upon rudder movement.

3. In rotary wing aircraft as claimed in claim 1, wherein the means interconnecting the rudder bar and control rods includes, a mixing unit having a pair of movable members with the respective movable members connected each to a control rod, a discriminator having a pair of movable members connected to the rudder bar for simultaneous movement when the rudder bar is moved, the movable members of the mixing unit and discriminator being interconnected so that movement of the respective discriminator members will cause movement of the respective members of the mixing unit, and the function lever being connected to the movable members of the mixing unit to pre-set them and to the interconnection between the members of the mixing unit and discriminator to control the relative amounts of movement given the respective members of the mixing unit upon movement of the rudder bar.

4. Mechanism for controlling two separate instrumentalities in varying ratios as required for pre-selected conditions comprising, a function lever, a discriminator unit including a pair of movable members, one to effect control of each instrumentality, a mixing unit including a pair of movable members, one to effect control of each instrumentality, means interconnecting each movable member of the mixing unit with one instrumentality to be controlled so that movement of the separate members of the mixing unit will control the separate instrumentalities, means interconnecting the movable members of the mixing unit with the movable members of the discriminator so that the movable member of the discriminator to effect control of one instrumentality will be coupled to the movable member of the mixing unit connected to that instrumentality, means interconnecting the function lever and the members of the mixing unit so that movement of the function lever will pre-set the members of the mixing unit in accordance with a pre-selected pattern, means interconnecting the function lever and the means interconnecting the members of the mixing and discriminator units to vary the movement imparted to the members of the mixing unit by movement of the discriminator members, and control means to move the discriminator members in unison.

5. Mechanism for controlling two separate instrumentalities as claimed in claim 4, wherein the movable members of the mixing unit are levers pivoted intermediate their ends each having one end connected to the instrumentality to be controlled and the other end connected to the function lever.

6. Mechanism for controlling two separate instrumentalities as claimed in claim 5, wherein the connection between the function lever and mixing unit levers include lost-motion connections to permit movement of one mixing unit lever when the function lever is moved in one direction and movement of the other mixing unit lever when function lever is moved in an opposite direction.

7. Mechanism for controlling two sepaarte instrumentalities as claimed in claim 6, wherein the movable members of the discriminator are center-pivoted levers, and the connections between the discriminator levers and the mixing unit levers include ratio rods pivotally connected to the mixing unit levers for bodily movement of those levers upon movement of the ratio rods, and sliding connections between the respective ratio rods and one arm of discriminator levers whereby the rods can be moved to different distances from the discriminator lever pivots.

8. Mechanism for controlling two separate instrumentalities in varying ratios as required for pre-selected conditions comprising, a function lever, a mixing unit including a pair of center-pivoted levers having floating pivots with one arm of each lever being connected to an instrumentality to be controlled and the other arm of each lever being connected to the function lever by a connection which will impart movement to one mixing unit lever when the function lever is moved in one direction and to the other mixing unit lever when the function lever is moved in an opposite direction, a discriminator unit including a pair of center-pivoted levers, ratio rods connected each to one mixing unit lever at a mid-point on the mixing unit lever for bodily movement of the mixing unit lever and to one arm of one discriminator unit lever, means interconnecting the other arms of the discriminator unit levers together for simultaneous movement, the connections between the ratio rods and the said one arms of the discriminator unit levers being slidable along the said one arms to place the ratio rods connections at varying distances from the center pivots of the discriminator unit levers, and means interconnecting the function lever and ratio rods to move the respective ratio rods in opposite directions along their respective discriminator unit lever arms upon movement of the function lever.

9. Mechanism for controlling two separate instrumentalities as claimed in claim 8, wherein a control bar is connected to one of said interconnected other arms of the discriminator unit levers.

10. Mechanism for controlling two separate instrumentalities as claimed in claim 8, wherein the connection between the function lever and the mixing unit levers includes a pair of cams having cam slots therein and a pair of rods each having one end pivoted in the cam slot of one cam and connected to one arm of one of the mixing unit levers, each cam slot having an actuating segment and a dwell segment with the actuating andd well segments of the cams of the pair being in reversed position.

11. Mechanism for controlling two separate instrumentalities as claimed in claim 10, wherein the floating pivots of the mixing unit levers are carried at the ends of separate arms each being pivotally mounted at its opposite end.

12. Mechanism for controlling two separate instrumentalities as claimed in claim 8, wherein the connection between the function lever and the mixing unit levers includes a pivot for the function lever and a pair of diverging arms fixed to the function lever and lying equidistant from a central reference plane passing through the function lever pivot when the function lever is in a neutral position, and rods interconnecting the respective diverging arms and the mixing unit levers, with the connections between the rods and the mixing unit levers lying in the said plane when the mechanism is in a neutral position.

References Cited in the file of this patent

UNITED STATES PATENTS

| | | |
|---|---|---|
| 2,547,255 | Bruel | Apr. 3, 1951 |
| 2,731,215 | Avery | Jan. 17, 1956 |
| 2,796,774 | Peed | June 25, 1957 |
| 3,026,068 | Spearman | Mar. 20, 1962 |